United States Patent
Kochura et al.

(10) Patent No.: US 11,182,489 B2
(45) Date of Patent: *Nov. 23, 2021

(54) INTELLIGENT INFORMATION PROTECTION BASED ON DETECTION OF EMERGENCY EVENTS

(71) Applicant: INTERNATIONAL BUSINESS MACHINES CORPORATION, Armonk, NY (US)

(72) Inventors: Nadiya Kochura, Bolton, MA (US); Fang Lu, Billerica, MA (US); Darian Christian Shane Springer, Somerville, MA (US); Ivy Malao, Somerville, MA (US); Kevin R. Giles, Salem, NH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/510,021

(22) Filed: Jul. 12, 2019

(65) Prior Publication Data

US 2020/0167470 A1 May 28, 2020

Related U.S. Application Data

(63) Continuation of application No. 16/202,768, filed on Nov. 28, 2018.

(51) Int. Cl.
*G06F 21/60* (2013.01)
*G06F 21/55* (2013.01)
*G06F 21/62* (2013.01)

(52) U.S. Cl.
CPC ............ *G06F 21/60* (2013.01); *G06F 21/554* (2013.01); *G06F 21/6245* (2013.01)

(58) Field of Classification Search
None
See application file for complete search history.

(56) References Cited

U.S. PATENT DOCUMENTS 7,965,998 B2   6/2011   Benco et al.
8,887,286 B2   11/2014  Dupont et al.
(Continued)

OTHER PUBLICATIONS

Patel et al., "A review of wearable sensors and systems with application in rehabilitation", https://jneuroengrehab.biomedcentral.com/articles/10.1186/1743-0003-9-21, Journal of NeuroEngineering and Rehabilitation, Apr. 20, 2012, 41 pages.
(Continued)

*Primary Examiner* — Benjamin E Lanier
(74) *Attorney, Agent, or Firm* — Scott Dobson; Andrew D. Wright; Roberts Calderon Safran & Cole, P.C.

(57) ABSTRACT

Methods for intelligent information protection based on detection of emergency events are disclosed. A method includes: applying, by a computing device, a safety tag to each of a plurality of data files; detecting, by the computing device, risk factors in a data stream indicating an unsafe situation; determining, by the computing device, a risk score based on the risk factors; and in response to the risk score exceeding a predetermined threshold, the computing device performing a security action on each of the plurality of data files based on the safety tag applied to each file.

19 Claims, 4 Drawing Sheets

(56) References Cited

U.S. PATENT DOCUMENTS

| | | | | |
|---|---|---|---|---|
| 8,924,352 | B1* | 12/2014 | Andruss | G06F 11/1461 |
| | | | | 707/640 |
| 9,865,260 | B1* | 1/2018 | Vuskovic | G06F 40/56 |
| 9,984,006 | B2 | 5/2018 | Amarendran et al. | |
| 10,747,606 | B1* | 8/2020 | Shemer | G06Q 10/0635 |
| 2007/0086257 | A1* | 4/2007 | Bernier | G11C 16/22 |
| | | | | 365/218 |
| 2008/0222734 | A1* | 9/2008 | Redlich | H04L 63/02 |
| | | | | 726/26 |
| 2008/0307084 | A1* | 12/2008 | Saigo | G06F 11/1458 |
| | | | | 709/223 |
| 2013/0073319 | A1* | 3/2013 | Du | G06Q 40/08 |
| | | | | 705/4 |
| 2014/0181982 | A1 | 6/2014 | Guo et al. | |
| 2014/0237599 | A1* | 8/2014 | Gertner | H04L 63/1441 |
| | | | | 726/24 |
| 2015/0286819 | A1* | 10/2015 | Coden | H04L 63/1425 |
| | | | | 726/23 |
| 2016/0357964 | A1* | 12/2016 | Mulchandani | G06F 21/566 |
| 2017/0091617 | A1 | 3/2017 | Baughman et al. | |
| 2017/0308421 | A1* | 10/2017 | Angeles | G06F 11/0709 |
| 2018/0027006 | A1* | 1/2018 | Zimmermann | G06F 9/46 |
| | | | | 726/11 |
| 2019/0095644 | A1* | 3/2019 | Park | G05B 15/02 |
| 2020/0050701 | A1* | 2/2020 | Ramasamy | G06F 3/0638 |

OTHER PUBLICATIONS

Goodnight, "How To Protect Your Data From A Hurricane, Flood, or Natural Disaster", https://www.howtogeek.com/71635/how-to-protect-your-datafrom-a-hurricane-flood-or-natural-disaster/, How-To-Geek, Aug. 26, 2011, 14 pages.

Aguilar, "Monitor Your Stress Levels Using Your Samsung Galaxy S5", https://gs5.gadgethacks.com/how-to/monitor-your-stress-levelsusing-your-samsung-galaxy-s5-0155203/, Gadget Hacks, Jun. 10, 2014, 4 pages.

Radhakrishnan et al., "Audio Analysis for Surveillance Applications", IEEE Workshop on Applications of Signal Processing to Audio and Acoustics, Oct. 16-19, 2005, 4 pages.

IBM, "System and Method for Automatically Detecting and Responding to Falls", ip.com, Feb. 21, 2007, 4 pages.

Akolkar et al., "Intelligent Virtual Machine Backups Using Events and Alarms of Virtual Infrastructure", ip.com, Jun. 17, 2011, 5 pages.

Anonymous, "A mechanism for intelligent enabling/disabling network protection rules based on host weakness", ip.com, Jun. 26, 2012, 4 pages.

Saoudi et al., "Intelligent Data Mining Techniques for Emergency Detection in Wireless Sensor Networks", IEEE 2016, Jul. 21, 2016, 8 pages.

Wang et al., "AnyControl—IoT Based Home Appliances Monitoring and Controlling", 2015 IEEE 39th Annual Computer Software and Applications Conference, Jul. 1-5, 2015, 17 pages.

Frame, "How to Know If a Laptop Has GPS Tracking", Techwalla, https://www.techwalla.com/articles/how-to-know-if-a-laptop-has-gps-tracking, accessed Nov. 28, 2018, 4 pages.

List of IBM Patents or Patent Applications Treated as Related, Jul. 11, 2019, 1 page.

Office Action dated Oct. 1, 2020 in U.S. Appl. No. 16/202,768, 13 pages.

Office Action dated Jan. 14, 2021 in U.S. Appl. No. 16/202,768, 22 pages.

Office Action dated Apr. 27, 2021 in U.S. Appl. No. 16/202,768, 21 pages.

* cited by examiner

INTELLIGENT INFORMATION PROTECTION BASED ON DETECTION OF EMERGENCY EVENTS

BACKGROUND

The present invention generally relates to computing devices and, more particularly, to methods and systems for intelligent information protection based on detection of emergency events.

User computing devices typically store a variety of user data, some of which is private/confidential data. Some user data may be duplicated across multiple user computing devices belonging to the same user, while other user data may only be present on one of the user computing devices belonging to that user.

SUMMARY

In a first aspect of the invention, there is a method that includes applying, by a computing device, a safety tag to each of a plurality of data files; detecting, by the computing device, risk factors in a data stream indicating an unsafe situation; determining, by the computing device, a risk score based on the risk factors; and in response to the risk score exceeding a predetermined threshold, the computing device performing a security action on each of the plurality of data files based on the safety tag applied to each file.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
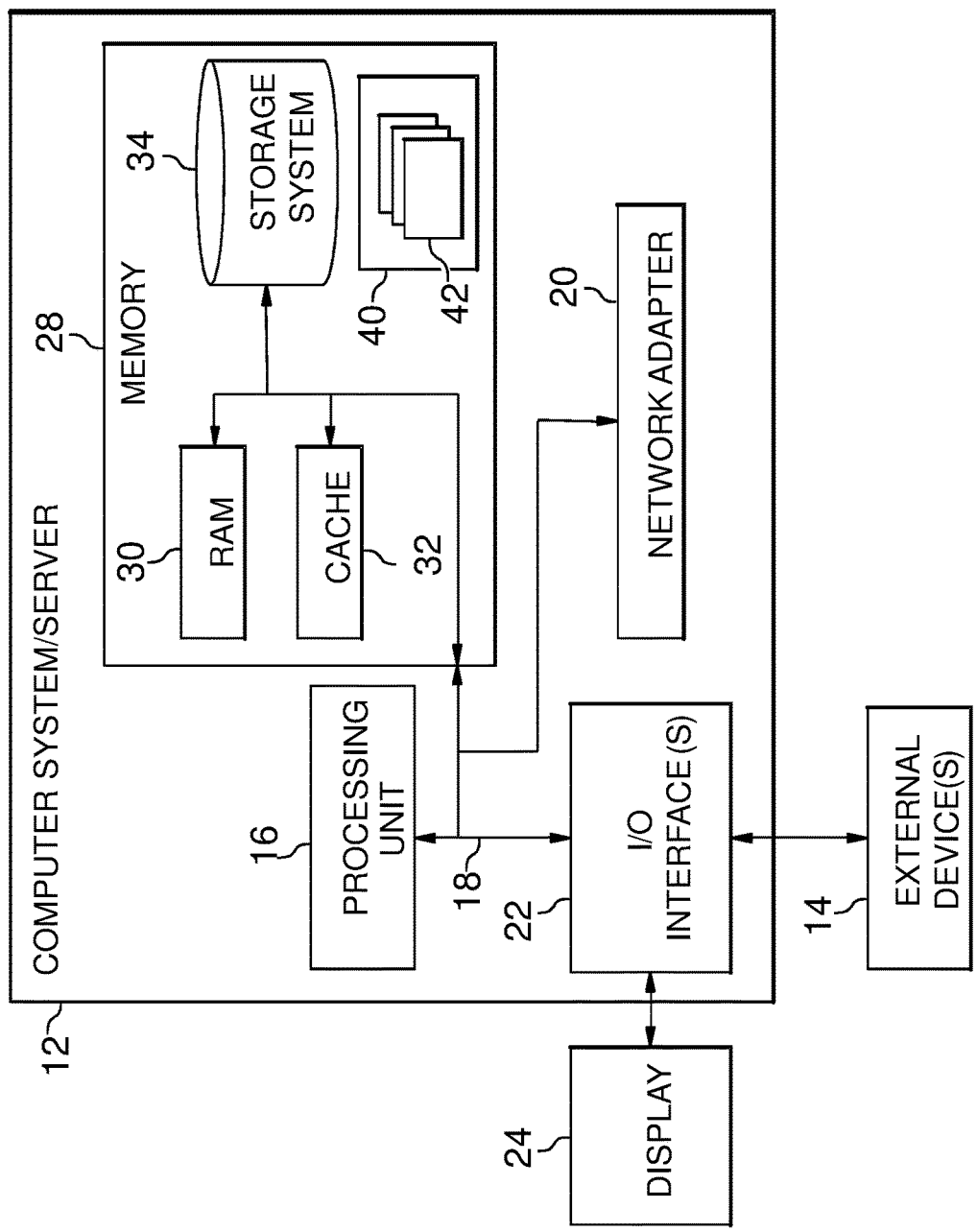
FIG. 1 depicts a computer system in accordance with aspects of the invention.

The present invention generally relates to computing devices and, more particularly, to methods and systems for intelligent information protection based on detection of emergency events. As described herein, aspects of the invention include a method and system for applying safety tags to data files, training cognitive modules to detect risk factors from sensor data streams, using the trained cognitive modules to detect risk factors from sensor data streams, determining a risk score based on the detected risk factors, and, in response to the determined risk score exceeding a predetermined threshold (e.g., being positive), securing data based on the applied safety tags.

Aspects of the present invention protect information stored on user computing devices in emergency situations and other unsafe situations. Embodiments address the problem of unauthorized individuals who have obtained unauthorized physical access to user computing devices accessing private/confidential data on the user computing devices without permission. Embodiments also address the problem of loss of user data on user computing devices in emergency situations in which the user computing devices may be damaged or destroyed (e.g., fires). Embodiments address these problems by detecting and evaluating risk factors from collected data sensor signals and preventively triggering a data protection procedure.

Accordingly, embodiments improve the functioning of a computer by providing methods and systems for intelligent information protection based on detection of emergency events. In particular, embodiments improve software by applying safety tags to data files and training cognitive modules to detect risk factors from sensor data streams. Additionally, embodiments improve software by using the trained cognitive modules to detect risk factors from sensor data streams, determining a risk score based on the detected risk factors, and, in response to the determined risk score being positive, securing data based on the applied safety tags. Accordingly, through the use of rules that improve computer-related technology, implementations of the invention allow computer performance of functions not previously performable by a computer. Additionally, implementations of the invention use techniques that are, by definition, rooted in computer technology (e.g., machine learning and cognitive computing techniques, including natural language understanding, a natural language classifier, voice and sentiment analysis, and image recognition).

In embodiments, risk factors from collected data sensor signals are detected and evaluated, and a data protection procedure is preventatively triggered based upon the evaluation of the risk factors. In particular, the system analyzes sensor data to detect signals indicating an emergency situation or an unsafe/risky situation. The system evaluates a risk score which indicates a likelihood of exposure or loss of user data on the computer device, and, in response to the risk score exceeding a predetermined threshold, triggers data safety procedures to protect the user data from loss and to protect sensitive/confidential user data from exposure. The safety procedure triggered by the system includes uploading/backing up data from local devices to a secured location (e.g., a cloud storage location), applying cryptography, and/or destroying sensitive/confidential user data.

In embodiments, the system intelligently predicts the risk to user data and preventively triggers a data safety procedure based upon the predicted risk exceeding a threshold. The system uses cognitive analytics to analyze sensor data from Internet of Things (IoT) sensor devices and identify signals indicating a non-secure or unsafe safe situation in a local environment (e.g., in a user's home or around a user's person).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system.

Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
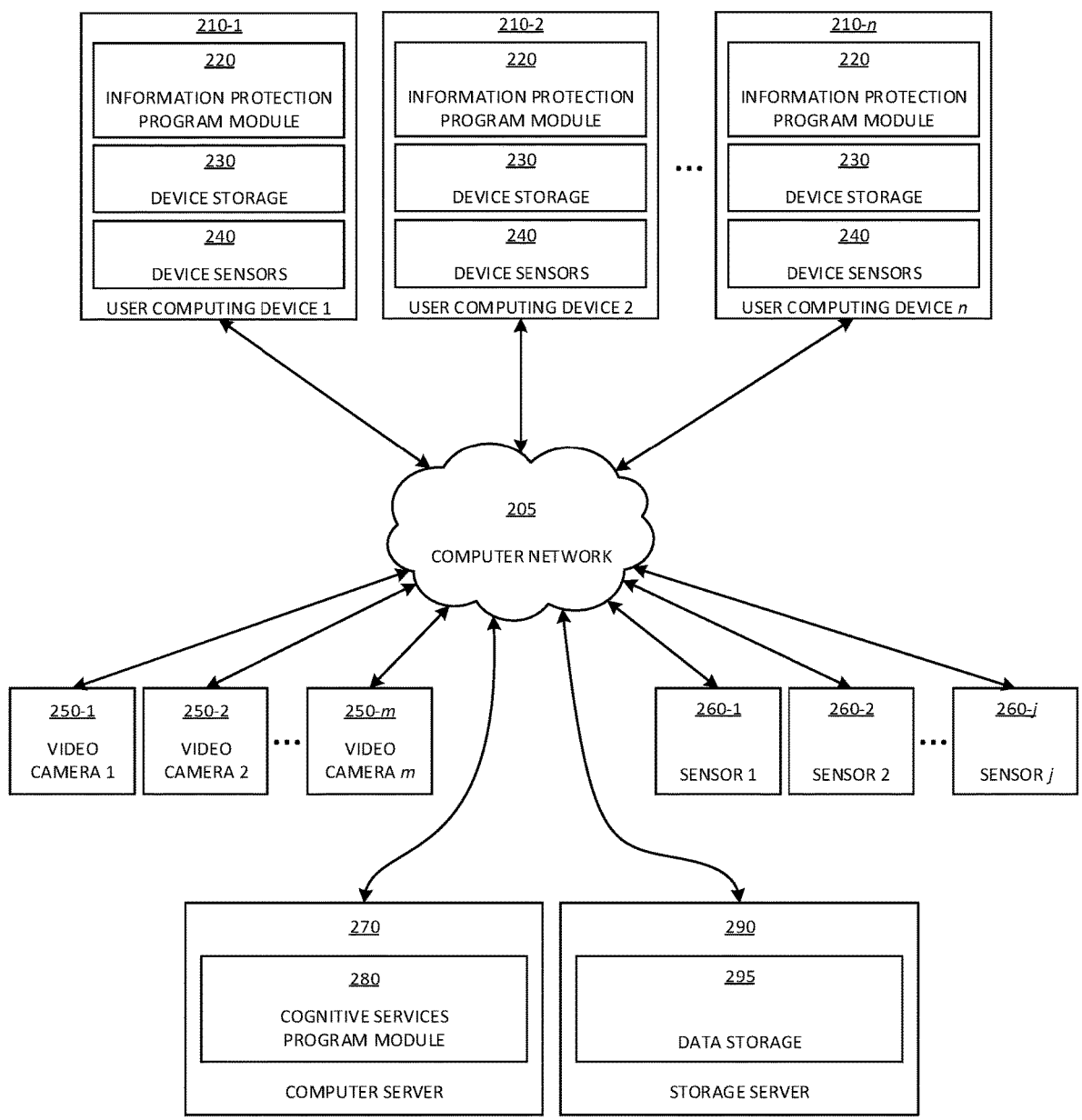
FIG. 2 depicts an illustrative environment in accordance with aspects of the invention.

FIG. 2 depicts an illustrative environment 200 in accordance with aspects of the invention. As shown, the environment 200 comprises a plurality of user computing devices 210-1, 210-2, . . . , 210-n, a plurality of video cameras 250-1, 250-2, . . . , 250-m, a plurality of sensors 260-1, 260-2, . . . , 260-j, a computer server 270, and a storage server 290 which are in communication via a computer network 205. In embodiments, the computer network 205 is any suitable network including any combination of a LAN, WAN, or the Internet. In embodiments, the plurality of user computing devices 210-1, 210-2, . . . , 210-n, the plurality of video cameras 250-1, 250-2, . . . , 250-m, the plurality of sensors 260-1, 260-2, . . . , 260-j, the computer server 270, and the storage server 290 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, each of the user computing devices 210-1, 210-2, . . . , 210-n is a computer device comprising one or more elements of the computer system/server 12 (as shown in FIG. 1). In embodiments, each of the user computing devices 210-1, 210-2, . . . , 210-n is a desktop computer, a laptop computer, a mobile device such as a cellular phone, tablet, personal digital assistant (PDA), or other computing device.

In embodiments, each of the user computing devices 210-1, 210-2, . . . , 210-n includes an information protection program module 220, which includes hardware and/or software and is one or more of the program modules 42 shown in FIG. 1. The information protection program module 220 includes program instructions for intelligent information protection based on detection of emergency events. In embodiments, the program instructions included in the information protection program module 220 of each of the user computing devices 210-1, 210-2, . . . , 210-n are executed by one or more hardware processors.

In embodiments, each of the user computing devices 210-1, 210-2, . . . , 210-n also includes device storage 230, which may be, for example, but is not limited to, an electronic storage device, a magnetic storage device, an optical storage device, an electromagnetic storage device, a semiconductor storage device, or any suitable combination of the foregoing. The device storage 230 stores a variety of user data files, some of which are private/confidential data files. Additionally, in embodiments, each of the user computing devices 210-1, 210-2, ..., 210-*n* includes device sensors 240, which include one or more of digital video cameras, digital still cameras, microphones, temperature sensors, motion sensors, location sensors, and any other type of digital sensor.

Still referring to FIG. 2, in embodiments, each of the plurality of video cameras 250-1, 250-2, ..., 250-*m* is a digital video camera or a digital still camera that captures video (including audio) and/or images of a user's home, workplace, or any other location where one or more of the user computing devices 210-1, 210-2, ..., 210-*n* is present. Additionally, in embodiments, each of the plurality of sensors 260-1, 260-2, ..., 260-*j* is a digital sensor such as digital video cameras, digital still cameras, microphones, temperature sensors, motion sensors, location sensors, and any other type of digital sensor that collects data in a user's home, workplace, or any other location where one or more of the user computing devices 210-1, 210-2, ..., 210-*n* is present. One or more of the plurality of sensors 260-1, 260-2, ..., 260-*j* may be an IoT sensor and/or a smart home sensor.

Still referring to FIG. 2, in embodiments, the computer server 270 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 270 includes a cognitive services program module 280, which includes hardware and/or software such as one or more of the program modules 42 shown in FIG. 1. The cognitive services program module 280 includes program instructions for using cognitive techniques and natural language understanding to analyze data received from the plurality of sensors 260-1, 260-2, ..., 260-*j* to detect risk signals that indicate emergency situations and other unsafe situations. In embodiments, the program instructions included in the cognitive services program module 280 of the computer server 270 are executed by one or more hardware processors.

In embodiments, the cognitive services program module 280 is trained to recognize risk signals from a data stream using machine learning and cognitive computing techniques, including natural language understanding, a natural language classifier, voice and sentiment analysis, and image recognition. For example, the cognitive services program module 280 is trained to recognize phrases such as "fire", "help", and "call 911" that indicate an emergency situation or an unsafe/risky situation is likely present. Additionally, the cognitive services program module 280 is trained to detect voice characteristics (e.g., shouting or a stressed tone) that indicate that an emergency situation or an unsafe/risky situation is likely present. The cognitive services program module 280 is also trained to recognize an emergency situation or an unsafe/risky situation (e.g., a fire) in video and still images.

Still referring to FIG. 2, in embodiments, the storage server 290 is a computer device comprising one or more elements of the computer system/server 12 (as shown in FIG. 1). In particular, the storage server 290 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the storage server 290 includes data storage 295, which stores data backups from one or more of the user computing devices 210-1, 210-2, ..., 210-*n*. The data storage 295 may be, for example, but is not limited to, an electronic storage device, a magnetic storage device, an optical storage device, an electromagnetic storage device, a semiconductor storage device, or any suitable combination of the foregoing. In other embodiments, the storage server 290 is a network storage server, a cloud storage server, a Storage Area Network (SAN), or Network Attached Storage (NAS).

Figure 3:
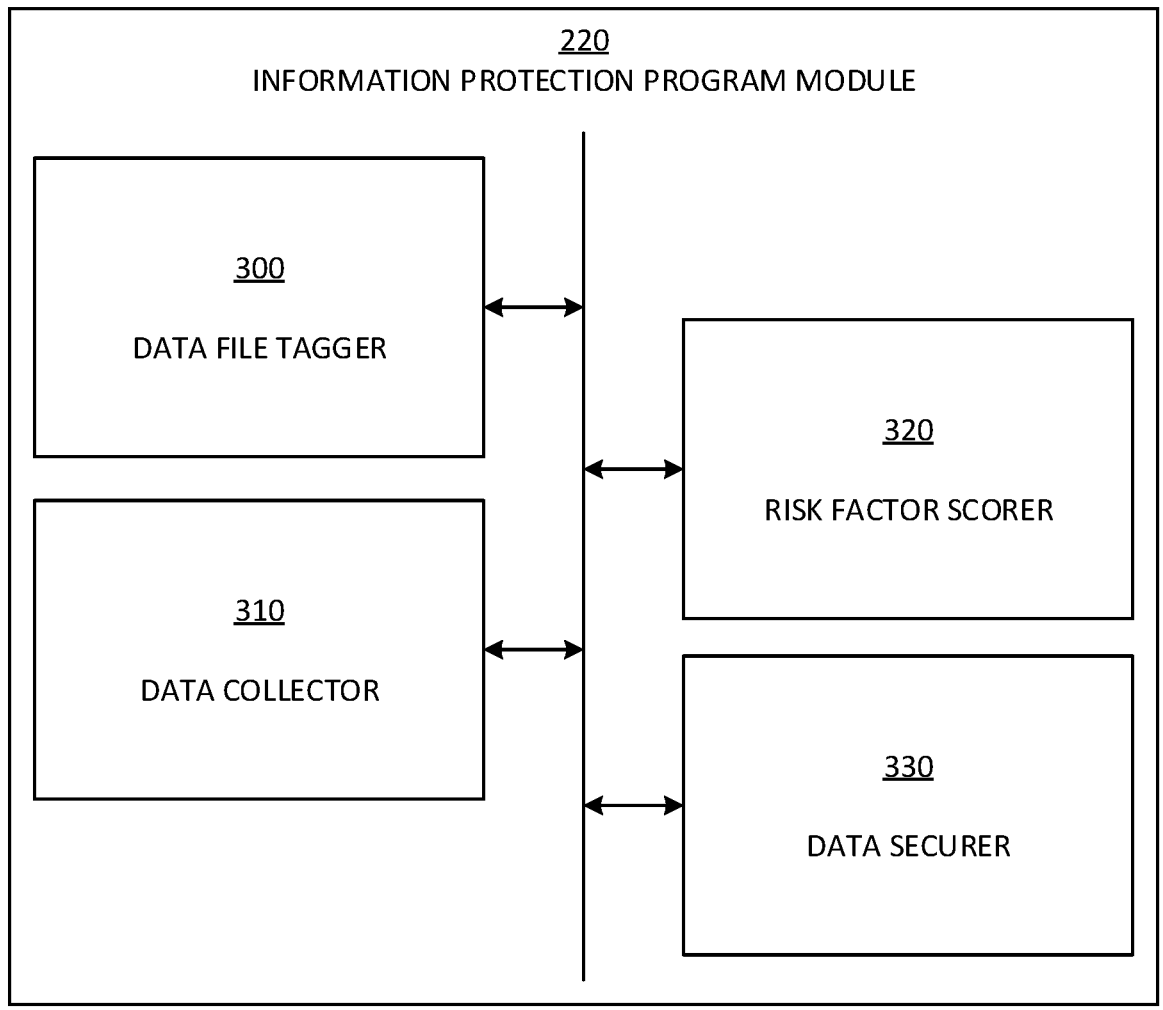
FIG. 3 depicts a block diagram of an exemplary program module in accordance with aspects of the invention.

FIG. 3 depicts a block diagram of an exemplary information protection program module 220 in each of the user computing devices 210-1, 210-2, ..., 210-*n* (of FIG. 2) in accordance with aspects of the invention. In embodiments, the information protection program module 220 includes a data file tagger 300, a data collector 310, a risk factor scorer 320, and a data securer 330, each of which may comprise one or more program modules 42 as described with respect to FIG. 1. In embodiments, the information protection program module 220 may include additional or fewer components than those shown in FIG. 3. In embodiments, separate components may be integrated into a single computing component or module. Additionally, or alternatively, a single component may be implemented as multiple computing components or modules.

In embodiments, the data file tagger 300 identifies and applies safety tags to data files stored on the device storage 230 on each of the user computing devices 210-1, 210-2, ..., 210-*n* (of FIG. 2) during normal operation (i.e., prior to an emergency situation or other unsafe situation being determined to exist by the risk factor scorer 320). As described below, the safety tags are used by the data securer 330 in the event that an emergency situation or other unsafe situation is determined to exist by the risk factor scorer 320. In particular, the safety tags designate a security action to be taken for a particular data file stored on the device storage 230 on a user computing device 210-1, 210-2, ..., 210-*n*, including, but not limited to, a backup action, a delete action, and an encrypt action.

In particular, the data file tagger 300 applies a safety tag designating the backup action to specify that the data securer 330 is to back up a data file on the device storage 230 to an external storage location such as the data storage 295 on the storage server 290 in the event that an emergency situation or other unsafe situation is determined to exist by the risk factor scorer 320. The data file tagger 300 applies a safety tag designating the delete action to specify that the data securer 330 is to delete a data file on the device storage 230 in the event that an emergency situation or other unsafe situation is determined to exist by the risk factor scorer 320. Finally, the data file tagger 300 applies a safety tag designating the encrypt action is used to specify that the data securer 330 is to encrypt a data file on the device storage 230 in the event that an emergency situation or other unsafe situation is determined to exist by the risk factor scorer 320.

In embodiments, the safety tags applied by the data file tagger 300 also designate a priority level that is used by the data securer 330 to determine an order in which to perform protective actions with respect to the data files stored on the device storage 230 in an emergency situation or other unsafe situation. (Time constraints may exist in an emergency situation or other unsafe situation such as a building fire that prevent a user computing device 210-1, 210-2, ..., 210-*n* from performing protective actions on all of the data files stored on the device storage 230.)

In embodiments, the data file tagger 300 applies safety tags to data files stored on the device storage 230 on each of the user computing devices 210-1, 210-2, ..., 210-*n* manually based on a request from a user. In particular, a user of a user computing device 210-1, 210-2, ..., 210-*n* may select a first group of data files stored on the device storage 230 and specify that a safety tag designating the backup action is to be applied to the first group of data files. The user may select a second group of data files stored on the device storage 230 and specify that a safety tag designating the delete action is to be applied to the second group of data files. The user may select a third group of data files stored on the device storage 230 and specify that a safety tag designating the encrypt action is to be applied to the third group of data files.

Additionally, in embodiments, the data file tagger 300 automatically applies safety tags based on the content of data files stored on the device storage 230. In particular, the data file tagger 300 determines that data files including keywords such as "confidential," "secret," "privileged," "undisclosed," etc. are private/confidential and therefore applies a safety tag designating the encrypt action to the data files.

Additionally, in embodiments, the data file tagger 300 automatically applies safety tags based on uniqueness of the data files stored on the device storage 230. In particular, the data file tagger 300 determines that a private/confidential data file stored on the device storage 230 that is also stored in an external location may be deleted, and therefore applies a safety tag designating the delete action to the data file. For example, the data file tagger 300 determines that a bank statement data file is a private/confidential data file that is also stored on a bank computing system. Accordingly, the data file tagger 300 applies a safety tag designating the delete action to the bank statement data file.

Still referring to FIG. 3, in embodiments, the data collector 310 collects data streams from the device sensors 240 in the user computing devices 210-1, 210-2, ..., 210-*n*, the plurality of video cameras 250-1, 250-2, ..., 250-*m*, and the plurality of sensors 260-1, 260-2, ..., 260-*j* and detects risk factors in the collected data streams indicating an emergency situation or an unsafe/risky situation. In particular, in embodiments, the data streams collected by the data collector 310 include video and/or audio data that is collected using the device sensors 240 in the user computing devices 210-1, 210-2, ..., 210-*n* and/or the plurality of video cameras 250-1, 250-2, ..., 250-*m*. The data collector 310 transmits this video and/or audio data to the cognitive services program module 280 on the computer server 270 for processing to identify signals that indicate an emergency situation or an unsafe/risky situation.

Additionally, in embodiments, the data streams collected by the data collector 310 include heartrate data or other biometric data collected using the device sensors 240 in the user computing devices 210-1, 210-2, ..., 210-*n*. The data collector 310 analyzes the collected heartrate data or other biometric data to determine whether the user is frightened or stressed, signals that may indicate an emergency situation or an unsafe/risky situation. In other embodiments, the data collector 310 transmits this heartrate data or other biometric data to the cognitive services program module 280 on the computer server 270 for processing to identify signals that indicate an emergency situation or an unsafe/risky situation, using cognitive computing techniques.

Additionally, in embodiments, the data streams collected by the data collector 310 include home/building security data collected using the plurality of sensors 260-1, 260-2, ..., 260-*j* (e.g., data from motion sensors, door/window sensors, smoke detectors, carbon monoxide detectors, explosive gas detectors, temperature sensors, etc.). The data collector 310 analyzes the collected home/building security data to identify signals that indicate an emergency situation or an unsafe/risky situation (e.g., an unauthorized person in the home/building, a fire, a carbon monoxide leak, or a gas leak). In other embodiments, the data collector 310 transmits this home/building security data to the cognitive services program module 280 on the computer server 270 for processing to identify signals that indicate an emergency situation or an unsafe/risky situation, using cognitive computing techniques.

Still referring to FIG. 3, in embodiments, the risk factor scorer 320 receives information from the data collector 310 and the cognitive services program module 280 about risk factors detected in the data streams collected by the data collector 310 from the device sensors 240 in the user computing devices 210-1, 210-2, ..., 210-*n*, the plurality of video cameras 250-1, 250-2, ..., 250-*m*, and the plurality of sensors 260-1, 260-2, ..., 260-*j*. The risk factor scorer 320 evaluates the information received about the detected risk factors in the data streams and computes a positive or negative risk score by applying decision tree rules. In the event that the risk score is positive, the risk factor scorer 320 triggers the data securer 330 to perform a data safety procedure.

In other embodiments, the risk factor scorer 320 uses Formula 1 below to determine the risk score:

$$RS = RF1*CF1 + RF2*CF2 + \ldots + RFk*CFk \qquad \text{Formula 1}$$

In Formula 1, above, RS is the risk score; RF1, RF2, ..., RFk are the risk factors, and CF1, CF2, ..., CFk are the corresponding confidence factors.

In an example, in a case in which the data collector 310 indicates that there is a risk factor for an unauthorized person, and a confidence level based on data from a plurality of building security sensors is high, the risk factor scorer 320 determines that the risk score is positive and triggers the data securer 330 to perform a data safety procedure. In another example, in a case in which the data collector 310 indicates that there is a risk factor for a fire, a confidence level based on data from a smoke detector is high, and a confidence level based on an evaluation of video/audio data by the cognitive services program module 280 is low, the risk factor scorer 320 determines that the risk score is positive and triggers the data securer 330 to perform a data safety procedure. In yet another example, in a case in which the data collector 310 indicates that there is a risk factor for a fire, the risk factor scorer 320 determines that the risk score is negative in response to analysis by the cognitive services program module 280 determining that the phrase "fire" was spoken by younger persons who are laughing and playing with a toy fire truck. Accordingly, in this example, the risk factor scorer 320 does not trigger the data securer 330 to perform the data safety procedure.

Still referring to FIG. 3, in embodiments, the data securer 330 performs a data safety procedure in response to the risk factor scorer 320 determining that a risk score is positive and triggering the data securer 330. In particular, the data securer 330 iterates over the data files stored in the device storage 230 of the user computing device 210-1, 210-2, ..., 210-*n* that are tagged with safety tags by the data file tagger 300 and performs a security action (e.g., a backup action, a delete action, or an encrypt action) on each data file corresponding to the safety tag associated with the data file and to the risk factor identified by the data collector 310 and scored by the risk factor scorer 320.

In embodiments, the security action to be performed by the data securer 330 on each data file is determined using a set of predefined safety rules. In an example, the data securer 330 uses a first safety rule that indicates that, if the risk score is positive and the risk factor is fire, a group of data files with a safety tag designating a backup action and a higher priority are to be backed up first to the data storage 295 on the storage server 290 by the data securer 330, and then a group of data files with a safety tag designating a backup action and a lower priority are to be backed up second to the data storage 295 on the storage server 290 by the data securer 330. Additionally, a group of data files with a safety tag designating a delete action and a group of data files with a safety tag designating an encrypt action are not deleted or encrypted by the data securer 330 since this action is not necessary in response to the risk factor for fire. In another example, the data securer 330 uses a second safety rule that indicates that, if the risk score is positive and the risk factor is an unauthorized person, a group of data files with a safety tag designating a delete action and a higher priority are to be deleted first by the data securer 330, and then a group of data files with a safety tag designating an encrypt action and a lower priority are to be encrypted second by the data securer 330.

Figure 4:
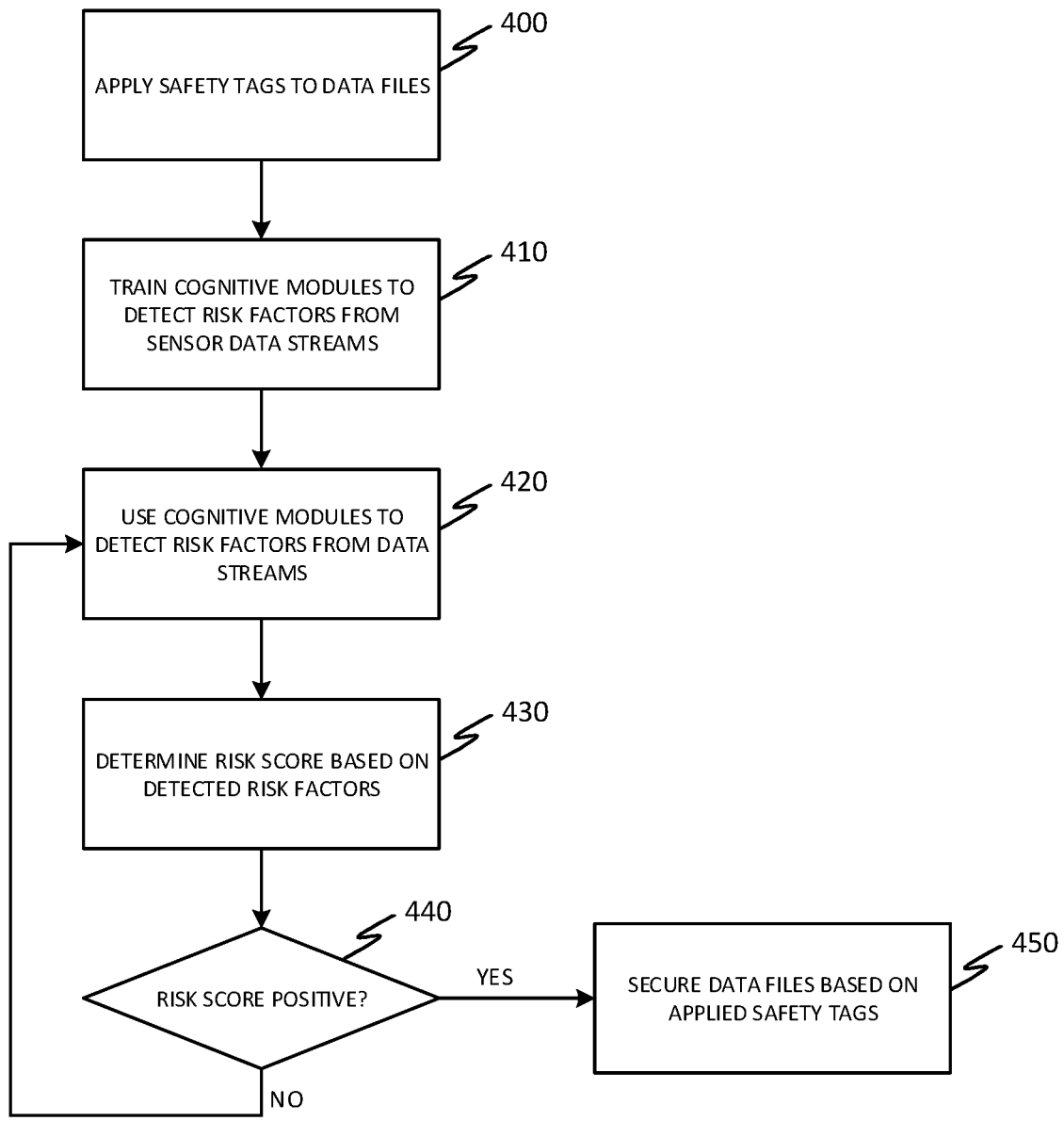
FIG. 4 depicts a flowchart of an exemplary method performed in accordance with aspects of the invention.

FIG. 4 depicts a flowchart of an exemplary method performed by the information protection program module 220 of each of the user computing devices 210-1, 210-2, . . . , 210-n in accordance with aspects of the invention. The steps of the method are performed in the environment of FIG. 2 and are described with reference to the elements shown in FIGS. 2 and 3.

At step 400, the system applies safety tags to data files. In embodiments, as described with respect to FIG. 3, step 400 comprises the data file tagger 300 of the information protection program module 220 identifying and applying safety tags to data files stored on the device storage 230 on each of the user computing devices 210-1, 210-2, . . . , 210-n (of FIG. 2) during normal operation (i.e., prior to an emergency situation or other unsafe situation being determined to exist by the risk factor scorer 320).

At step 410, the system trains cognitive modules to detect risk factors from sensor data streams. In embodiments, step 410 comprises the cognitive services program module 280 being trained to recognize risk signals from a data stream using machine learning and cognitive computing techniques, including natural language understanding, a natural language classifier, voice and sentiment analysis, and image recognition.

At step 420, the system uses the cognitive modules to detect risk factors from data streams. In embodiments, as described with respect to FIG. 3, step 420 comprises the data collector 310 of the information protection program module 220 collecting data streams from the device sensors 240 in the user computing devices 210-1, 210-2, . . . , 210-n, the plurality of video cameras 250-1, 250-2, . . . , 250-m, and the plurality of sensors 260-1, 260-2, . . . , 260-j and using the cognitive services program module 280 to detect risk factors in the collected data streams indicating an emergency situation or an unsafe/risky situation.

At step 430, the system determines a risk score based on the detected risk factors. In embodiments, as described with respect to FIG. 3, step 430 comprises the risk factor scorer 320 receiving information from the data collector 310 and the cognitive services program module 280 about risk factors detected in the data streams collected by the data collector 310 from the device sensors 240 in the user computing devices 210-1, 210-2, . . . , 210-n, the plurality of video cameras 250-1, 250-2, . . . , 250-m, and the plurality of sensors 260-1, 260-2, . . . , 260-j. The risk factor scorer 320 evaluates the information received about the detected risk factors in the data streams and computes a positive or negative risk score by applying decision tree rules.

At step 440, the system determines whether or not the risk score is positive. In embodiments, as described with respect to FIG. 3, the risk factor scorer 320 determines whether the risk score from step 430 is positive or negative. If the risk score is positive, then the flow continues to step 450. On the other hand, if the risk score is negative, then the flow returns to step 420.

At step 450, the system secures data files based on the applied safety tags. In embodiments, as described with respect to FIG. 3, step 450 comprises the data securer 330 performing a data safety procedure in response to the risk factor scorer 320 determining that a risk score is positive at step 440. In particular, the data securer 330 iterates over the data files stored in the device storage 230 of the user computing device 210-1, 210-2, . . . , 210-n that are tagged with safety tags by the data file tagger 300 and performs a security action (e.g., a backup action, a delete action, or an encrypt action) on each data file corresponding to the safety tag associated with the data file and to the risk factor identified by the data collector 310 and scored by the risk factor scorer 320.

Accordingly, it is understood from the foregoing description that embodiments of the invention provide a method for data protection based on detected events, comprising: providing priority and security level tags to files; receiving IoT/sensor/video/audio data; identifying risk factors in the data using natural language processing, image recognition, and voice and sentiment analysis; calculating a risk score based on the identified risk factors; and in response to the risk score and according to the priority and security level tags, performing security actions on the files (backup, encrypt, destroy).

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   applying, by a computing device, a safety tag to each of a plurality of data files, each of the safety tags being based on a uniqueness of a corresponding one of the data files, each of the safety tags specifying a security action;
   detecting, by the computing device, risk factors in a data stream indicating an emergency situation at a first location;
   determining, by the computing device, a risk score based on the risk factors;
   determining, by the computing device, that a first data file of the data files is stored in a storage device at the first location, the uniqueness of the first data file indicating that the first data file is also stored in a location that is external to the first location, the safety tag of the first data file designating a security action of encryption; and
   determining, by the computing device, to not encrypt the first data file based on the risk score exceeding a predetermined threshold and encryption not being necessary to protect data in the first data file in the emergency situation.

2. The method according to claim 1, wherein the safety ags further specify a priority with which the security action is to be performed.

3. The method according to claim 1, further comprising using natural language understanding, a natural language classifier, and voice and sentiment analysis to detect the risk factors in the data stream.

4. The method according to claim 1, further comprising using image recognition to detect the risk factors in the data stream.

5. The method according to claim 1, wherein the data stream includes video data and audio data.

6. The method according to claim 1, wherein the data stream includes sensor data from Internet of Things sensors.

7. A method comprising:
   applying a safety tag to each of a plurality of data files, each of the safety tags specifying a security action;
   detecting risk factors in a data stream indicating an emergency situation at a first location;
   determining a risk score based on the risk factors and a confidence level in each of the risk factors, the confidence level in a first risk factor of the risk factors being based on analysis of a phrase spoken by a person at the location;
   determining that a first data file of the data files is stored in a storage device at the first location, the first data file also being stored in a location that is external to the first location, the safety tag of the first data file designating a security action of encryption; and
   determining to not encrypt the first data file based on the risk score exceeding a predetermined threshold and encryption not being necessary to protect data in the first data file in the emergency situation.

8. The method according to claim 7, wherein the analysis of the phrase spoken by the person indicates that the phrase is not indicative of the emergency situation, and
   the phrase spoken by the person reduces the risk score.

9. The method according to claim 7, wherein the phrase spoken by the person indicates that the phrase is indicative of the emergency situation.

10. The method according to claim 7, wherein the first data file has a first priority of protective action,
    a second data file of the data files has a second priority of protective action, and
    the first priority is more important than the second priority.

11. The method according to claim 7, wherein individual ones of the safety tags are based on a content of one of the data files to which the safety tag is applied.

12. The method according to claim 7, wherein the data stream includes building security data collected by a plurality of sensors.

13. The method according to claim 7, wherein the risk score is a sum of:
    each of the risk factors multiplied by the confidence level corresponding to each particular one of the risk factors.

14. The method according to claim 1, wherein the uniqueness of a second data file of the plurality of data files indicates that the second data file is not also stored in a location that is external to the first location.

15. The method according to claim 1, wherein the safety tag of a second data file of the plurality of data files designates a different security action for the emergency situation than the security action of the first data file.

16. The method according to claim 15, wherein the security action performed on the second data file is backing up the second data file to a location that is external to the first location.

17. The method according to claim 1, wherein the first data file is a higher priority data file than a second data file of the plurality of data files, and the first data file is encrypted before the second data file based on the priority.

18. The method according to claim 1, wherein a safety tag of a second data file of the plurality of data files designates a security action of backing up the second data file to a location that is external to the first location, and further comprising backing up the second data file based on the safety tag of the second data file and the emergency situation.

19. The method according to claim 18, wherein:
    the emergency situation is a fire;
    the first data file is not encrypted in response to the fire; and
    the second data file is backed up in response to the fire.

* * * * *